United States Patent [19]

Gordon

[11] 3,961,335
[45] June 1, 1976

[54] GRAPHIC RECORDER WITH PAPER POSITIONING AND TENSIONING MEANS

[75] Inventor: James F. Gordon, Saratoga, Calif.

[73] Assignee: Zeta Research Inc., Lafayette, Calif.

[22] Filed: Dec. 16, 1974

[21] Appl. No.: 532,897

[52] U.S. Cl. .............................. 346/136; 346/139 R; 226/95; 226/195
[51] Int. Cl.² .................. G01D 15/30; B65H 17/28
[58] Field of Search ................ 346/136, 141, 139 R; 226/95, 195; 242/182, 147 R, 147 A

[56] References Cited
UNITED STATES PATENTS

| | | | |
|---|---|---|---|
| 3,188,645 | 6/1965 | Trumpy et al. ................... | 346/136 X |
| 3,289,908 | 12/1966 | Engle ................................ | 226/195 |
| 3,305,873 | 2/1967 | Mourier ............................ | 346/136 X |
| 3,355,166 | 11/1967 | Plumb .............................. | 226/95 X |
| 3,392,930 | 7/1968 | Goldfarb ......................... | 346/136 UX |
| 3,460,158 | 8/1969 | Bravenec .......................... | 346/136 |
| 3,468,606 | 9/1969 | Wolf et al. ........................ | 226/95 X |
| 3,499,614 | 3/1970 | Badum .............................. | 242/182 |
| 3,653,068 | 3/1972 | Gordon ............................ | 346/136 |
| 3,673,604 | 6/1972 | Gordon ............................ | 346/141 X |
| 3,681,779 | 8/1972 | Darnell ............................ | 346/136 |
| 3,883,060 | 5/1975 | Scarpa ............................ | 242/182 X |

*Primary Examiner*—L. T. Hix
*Assistant Examiner*—Stanley J. Witkowski
*Attorney, Agent, or Firm*—Flehr, Hohback, Test

[57] ABSTRACT

A graphic recorder for use in recording information on a strip chart. The recorder includes a housing having a pair of rollers mounted at opposite ends of an opening across which the strip chart moves. Radially outwardly extending pins are mounted at opposite ends of each of the rollers for registering with and engaging positioning holes formed along the edges of the strip chart. Drive apparatus is provided for reversibly turning the rollers conjointly to move the strip chart along an X-axis. Apparatus is provided for creating a partial vacuum in a chamber within the housing so as to tension the portion of the strip chart suspended between the rollers along a curved path for properly positioning the chart with respect to the pins on the rollers. A recording head is mounted on the cover of the housing for movement along a Y-axis for marking the strip chart. When the cover is opened air is admitted into the housing for reducing the vacuum so that tension on the suspended portion of the strip chart is relieved to facilitate removal and replacement of the strip chart.

14 Claims, 7 Drawing Figures

GRAPHIC RECORDER WITH PAPER POSITIONING AND TENSIONING MEANS

BACKGROUND OF THE INVENTION

This invention relates in general to graphic recorders, and in particular relates to recorders, such as incremental plotters, for use with strip charts.

Prior art graphic recorders of the type described commonly employ rollers having sprocket pins which engage positioning holes formed along the edges of a strip chart, with the rollers being driven so as to move the strip chart along an X-axis while a marking instrument is moved along a Y-axis for recording information on the chart. An example of such a recorder is that described in U.S. Pat. No. 3,673,604 issued June 27, 1972 and assigned to the assignee of the present invention. Heretofore there has been a difficult problem in maintaining precise registry of the strip chart on the rollers, with the result that recording accuracy has not been optimum and chart speed has been limited. Among the problems which arise are that the chart paper can change dimensions as much as seven percent due to changes in temperature and moisture, or both. Another trouble source is that of uneven wear on the positioning holes from engagement by the sprocket pins, with the result that the chart does not maintain proper registry on the rollers where repeated passes are made through the recorder. In addition, improper registry of the chart can result from manufacturing inaccuracy and dimension tolerances of the positioning holes.

A number of devices have been developed in an attempt to correct the foregoing problems. Among these devices are spring-loaded floating sprockets or floating shafts which are arranged so as to tension the paper in the recorder. However, such devices have not been entirely satisfactory for a number of reasons. The devices inherently develope undesirable friction loading on the paper which increases the paper driving power requirement, degrades registration accuracy and limits the maximum paper travel velocity. Where repeated passes are made over the same section of the chart these problems are compounded. In certain of the devices the floating sprockets are individually spring-loaded rotationally against the paper to create tension. However, such sprockets act as small flywheels so that as high direction reversal rates are encountered the inertia of the sprockets causes the pins to forefully engage and wear the positioning holes.

Another problem associated with previous graphic recorders is that which arises from the use of fan-fold type paper as the strip chart. The alternate ridges and valleys of the creases in this type of paper present an uneven surface under the writing stylus. The ridges in the paper especially interfere with proper writing action. Heretofore graphic recorders have employed various devices to solve this problem, such as the use of a relatively small diameter rod which supports the paper underneath the stylus. However, the use of such a rod introduces additional frictional drag on the paper, and this is objectional from the standpoint of power requirements for driving the paper and further limits the travel speed of the paper.

OBJECTS AND SUMMARY OF THE INVENTION

It is a general object of the invention to provide a new and improved graphic recorder which achieves greater accuracy of paper registration in the recorder, which achieves higher paper travel speed, and which provides for more accurate and consistent marking of the chart paper.

Another object is to provide a recorder of the type described which will maintain correct paper registration while automatically compensating for any variation in paper dimensions, and for wear or manufacturing inaccuracy in the positioning holes of the chart paper. Correct registration is achieved even for multiple passes of the chart through the recorder.

Another object is to provide a recorder of the type described which supports the chart paper in correct position with relatively little friction loading on the paper so as to minimize any tendency to distort the positioning holes in the paper.

Another object is to provide a recorder of the type described which reduces friction on the paper and permits the paper to be moved at high speeds in either direction with a minimum driving power requirement.

Another object is to provide a recorder of the type described which is relatively simple in design and construction, which eliminates the requirement for the relatively complicated floating sprockets or floating shafts, and which substantially eliminates the requirement for mechanical adjustment both during assembly of the recorder and by the user.

Another object is to provide a recorder of the type described which affords relatively simple and quick loading, positioning and unloading of the chart paper.

Another object is to provide a recorder of the type described which reduces the tendancy for the creases in fan-fold type paper to interfere with proper marking of the recording instrument.

The recorder of the invention includes a housing having an upwardly directed opening with a pair of rollers mounted at opposite ends of the opening. A plurality of radial pins are fixedly mounted at opposite ends of the two rollers for engaging positioning holes which are formed along the edges of the strip chart. Drive means is provided for rotating the rollers conjointly for reversibly moving the chart along an X-axis. Means is provided to create a partial vacuum in a chamber below a downwardly curved portion of the chart so that the resulting differential air pressure tensions the chart paper. The tension forces in the paper establish proper registration of the positioning holes with the pins. A marking instrument is mounted on a cover of the housing for movement along a Y-axis. One of the rollers is employed as a backup surface for the marking instrument, which is positioned on the tension side of the paper so as to flatten out the ridges which occur in fan-fold type paper. The cover is arranged to be opened for reduction of the vacuum to release the tension on the paper and facilitate removal and replacement of the chart. The electronic circuitry for operating the recorder is cooled by being positioned in the path of air which is exhausted from the vacuum chamber.

The foregoing and additional objects and features of the invention will become apparent from the following description in which the preferred embodiment has been set forth in detail in conjunction with the accompanying drawings.

DESCRIPTION OF THE PREFERRED EMBODIMENT

Figures 1, 6:
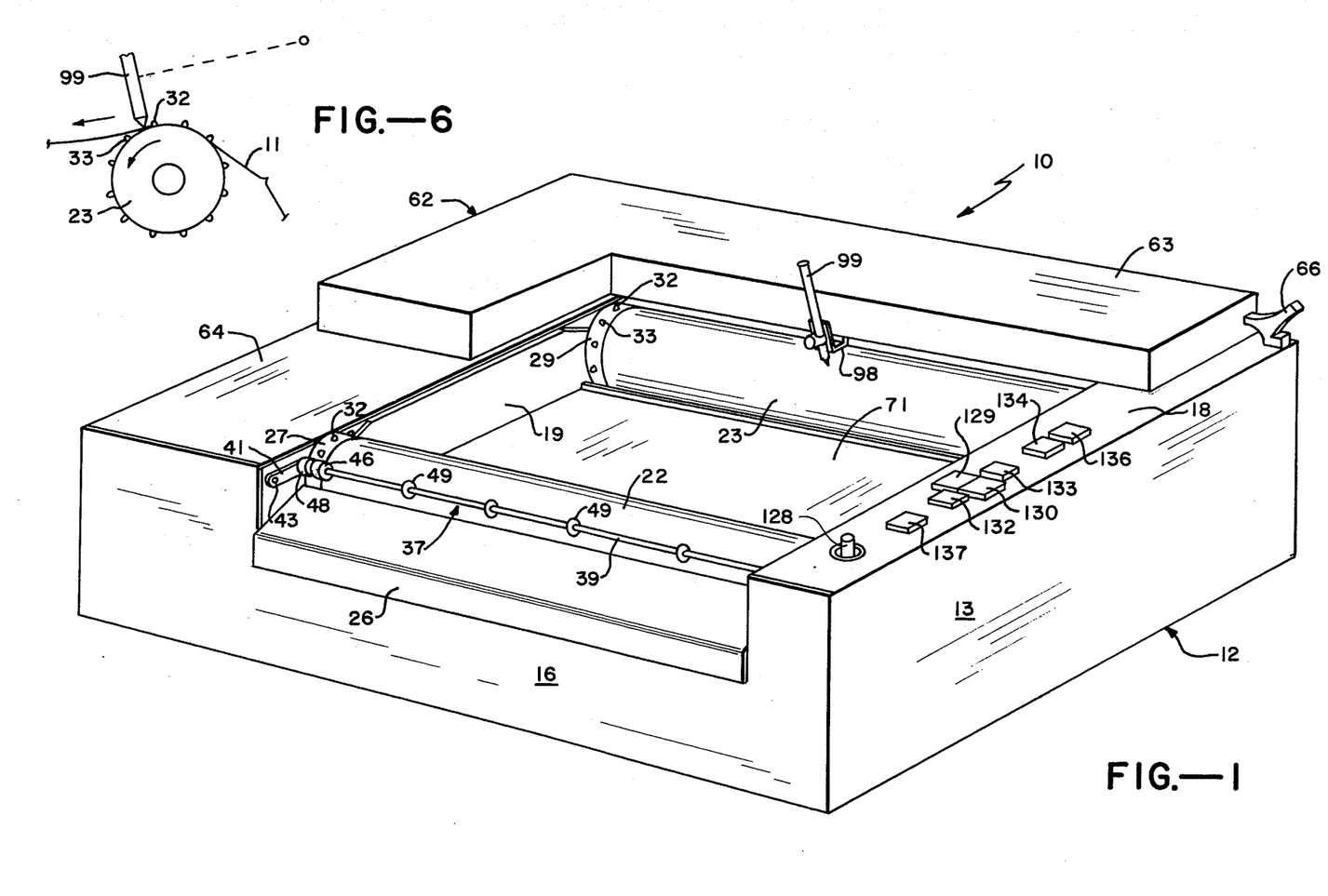
FIG. 1 is a perspective view of a graphic recorder incorporating the invention.
FIG. 6 is a fragmentary side elevational view illustrating the operation of the marking pen of the invention.

In the drawings FIG. 1 illustrates generally at 10 a graphic recorder incorporating the present invention. Recorder 10 is utilized as an incremental plotter for graphically recordering information on a strip of suitable recording medium, such as the illustrated fan-fold paper strip chart 11 shown in FIGS. 4–6. In addition, the recorder of the invention can be used with rolled chart paper.

Recorder 10 includes a housing 12 having a boxlike shape and which is comprised of a pair of sidewalls 13, 14, a pair of end walls 16, 17, a top deck 18 and a bottom plate 15 which is held above a supporting table or other surface by means of legs 21. See FIGS. 1–7 A pair of spaced-apart, parallel upright mounting plates 19, 20 extend between end walls 16 and 17 to define an upwardly directed rectangular opening across which a portion of the strip chart is positioned for operation. A pair of hollow cylindrical rollers 22, 23 are mounted on the support plates for rotation about parallel axes which extend in the direction of the Y-axis shown in FIG. 2, and the two rollers are spaced-apart along the X-axis.

Figure 2:
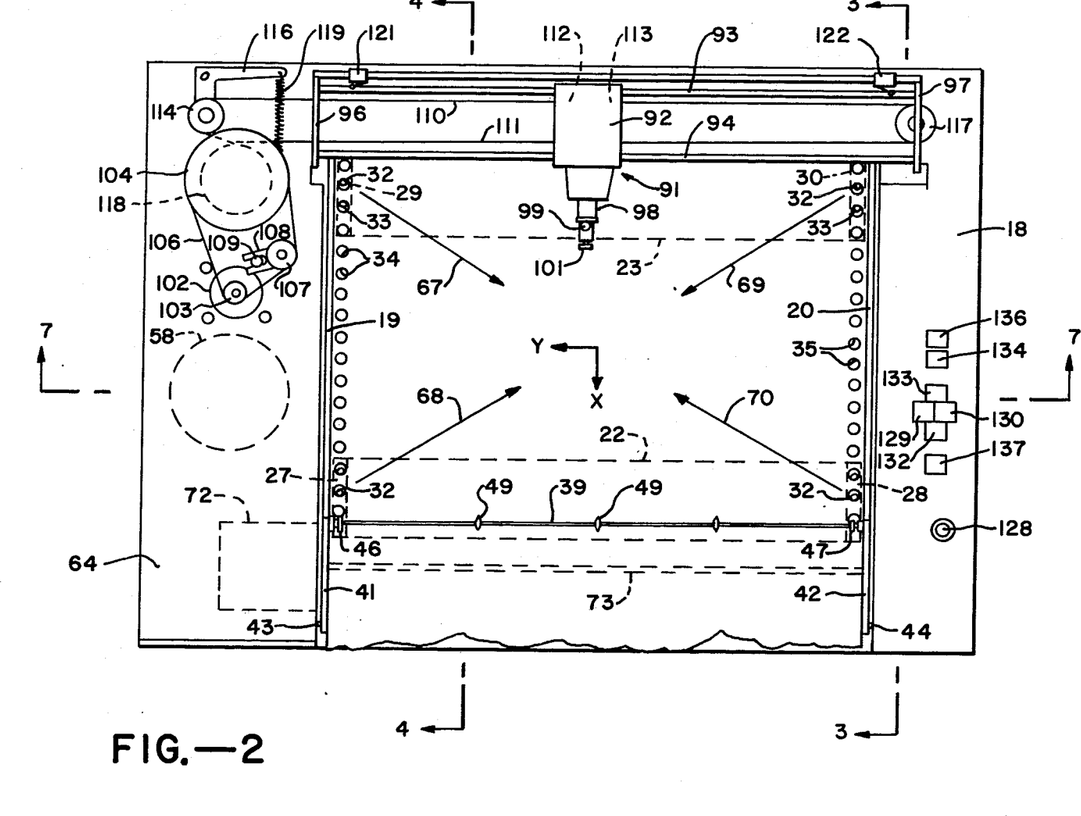
FIG. 2 is a top plan view of the recorder of FIG. 1 shown with the cover removed.
Figure 3:
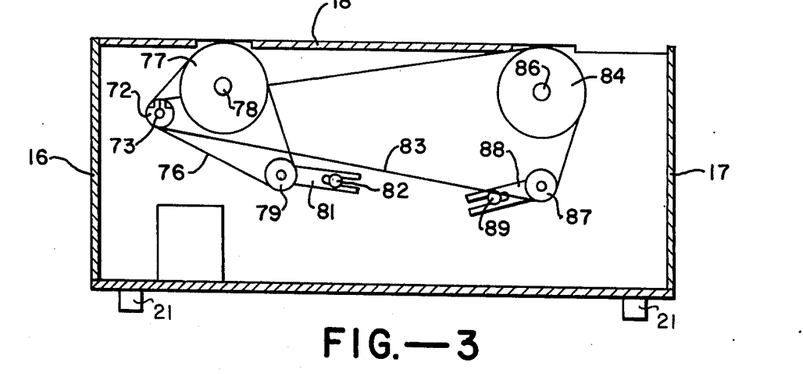
FIG. 3 is a cross-sectional view taken along the line 3—3 of FIG. 2.
Figure 4:
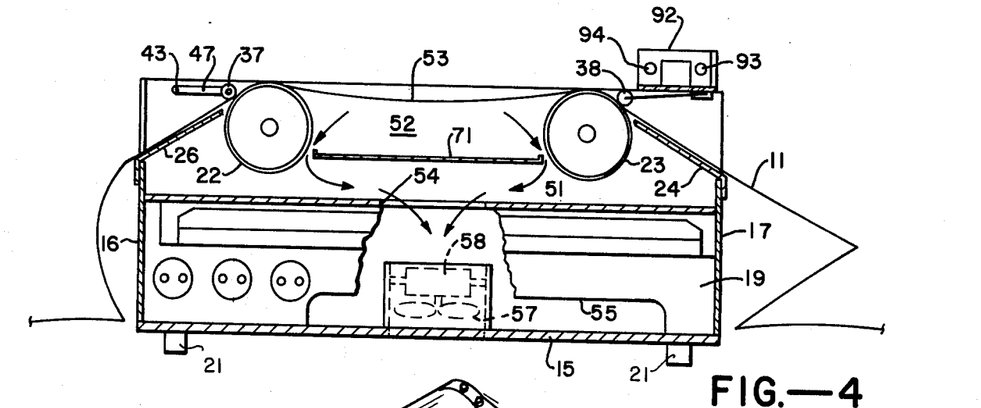
FIG. 4 is a cross-sectional view taken along the line 4—4 of FIG. 2.

Strip chart 11 is installed above the rollers for reversing movement across the opening in the direction of the X-axis. As illustrated in FIG. 4 an upwardly and inwardly inclined ramp 24 is mounted across rear wall 17 for feeding the strip chart to and from roller 23, while a similar upwardly and inwardly inclined ramp 26 is mounted across front wall 16 for feeding the chart to and from roller 22.

Means are provided for releasably engaging the strip chart with the rollers, and this means includes matching pairs of drive sprockets 27, 28 and 29, 30 which are mounted at opposite ends of respective rollers. The drive sprockets are formed with radially outward directed pins 32, 33 which are mounted at equally spaced-apart positions about the sprocket peripheries. The sprockets are mounted for rotation with the rollers so that the pins move into and out of engagement with a plurality of positioning holes 34, 35 which are formed at equally spaced-apart positions along the side edges of the strip chart. During manufacture of the recorder the drive sprockets are assembled onto the respective rollers by a suitable jig so that corresponding pins on opposite ends of each roller are in precise axial register, and the sprockets are then fixedly attached to the rollers so that the pins cannot come out of register, thereby eliminating the requirement for subsequent adjustment of the sprockets.

A pair of hold-down frames 37, 38 are mounted adjacent respective rollers 22 and 23 for holding down and guiding the paper on the rollers to insure proper engagement of the pins with the positioning holes. Hold-down frame 37 is typical of the two frames and includes a horizontally extending bar 39 mounted at its opposite ends on a pair of arms 41, 42 which in turn are pivotally mounted on support plates 19 and 20 through pivot connections 43 and 44. A pair of circular spools 46, 47 formed of a suitable low friction material such as Delrin or Nylon are mounted at opposite ends of bar 39. A circular groove 48 is formed about each spool for riding over the path of movement of the sprocket pins, with the outer cylindrical surface of the spools being adapted to contact and roll against the side margins of the strip chart. A plurality of disc-shaped rollers 49 are mounted at longitudinally spaced positions on bar 39, and these rollers are adapted to contact and hold down the paper across the width of cylindrical rollers 22, 23.

A horizontal partition 51 is mounted within housing 12 between the support plates at a position spaced below the two rollers. The partition forms a vacuum chamber 52 in cooperation with the support plates 19, 20, end walls 16, 17 and the portion 53 of the strip chart which is suspended between the two rollers. The suspended portion 53 thereby acts as a diaphragm, as shown in FIG. 4. At least one circular opening 54 is formed in partition 51 for communication with chamber 50 which lies above bottom plate 15. Chamber 50 in turn communicates through an opening 55 in plate 19 with a bay 56 which is formed between plate 19, sidewall 14, end walls 16 and 17 and bottom plate 15. Means is provided for exhausting air from vacuum chamber 52, and this means includes a fan 57 which is mounted in a cylindrical shroud 58 and is driven by a suitable electric motor 59. Motor 59 is supported concentric of the shroud by a bracket 60. The motor drives the fan in a rotational direction which blows air downwardly for exhaust from the housing through an opening 61 formed in the bottom plate.

Figure 7:
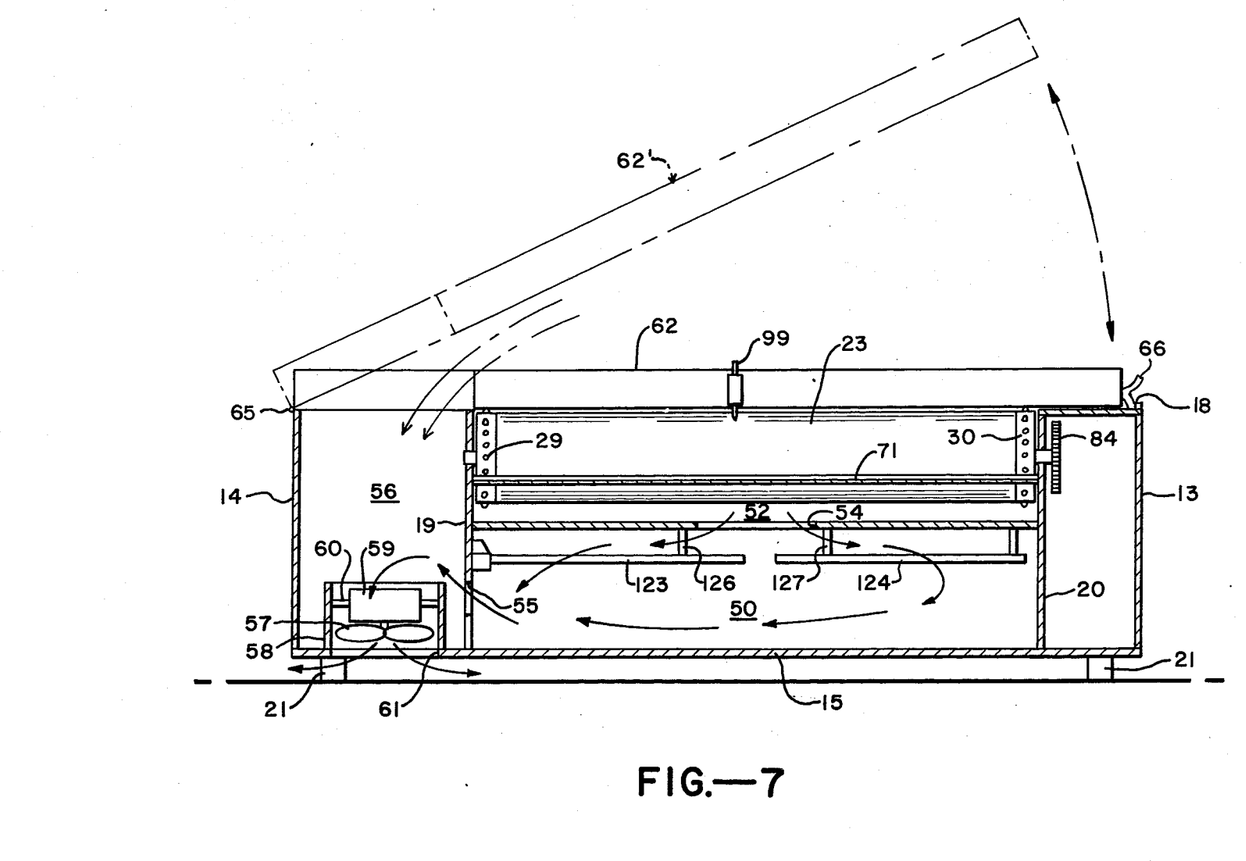
FIG. 7 is a cross-sectional view taken along the line 7—7 of FIG. 2.

A top cover 62 is provided and includes an L-shaped enclosure 63 mounted at one end to a flat plate 64 which in turn is mounted by hinge joint 65 for pivotal movement between the closed position indicated in solid line in FIG. 7 and the open position indicated at 62'. In the closed position the bottom edges of the cover form an effective air seal over the top of bay 56. A suitable latch 66 is provided for releasably latching the cover in its closed position.

With cover 62 closed and a strip chart in place between the rollers 22, 23 operation of fan 57 exhausts air from bay 56 and the chambers 50 and 52 for creating a partial vacuum below the diaphragm formed by the suspended portion 53 of the strip chart. A certain amount of air leaks from around the side edges of the chart and through its positioning holes.

The differential air pressure created by the partial vacuum in chamber 52 produces a downwardly directed resultant force acting at substantially the center of the suspended portion, which is thereby tensioned in a downwardly convex curvature, as illustrated in FIG. 4. The tension forces which are produced in the paper pull the positioning holes against the associated sprocket pins along diagonal lines toward the center of the paper, as shown by the force vectors 67–70 illustrated in FIG. 2. These positioning holes thereby engage the pins at uniform places and with even pulling forces. In addition the pressure differential acts to assist in holding the end margins of the suspended portion in contact against the rollers to improve the marking action where one roller is used as a back-up surface for the stylus.

The chart paper is installed by the operator across the rollers with a pre-determined amount of downward droop in the suspended portion, i.e., the center of the suspended portion 53 has a certain vertical displacement from the line of tangency across the upper surfaces of the two rollers. For a given pressure differential force acting on the chart the tension forces in the paper are proportional to the amount of droop, i.e., the shallower the droop then the greater the tension forces. While the amount of droop required to create the proper paper tension for a particular application will depend on variables such as the type of chart paper employed and the dimensions of the recorder, it has been found optimum in one specific application to provide a one inch droop for an eight inch separation between the rollers.

A horizontal center plate 71 is mounted across the support plates 19, 20 between the two rollers at a pre-determined elevation below the line of tangency across the upper surfaces of the rollers. The upturned side edges of plate 71 are closely spaced from the rollers to permit air to be drawn through the spaces for creating the partial vacuum below the chart. Center plate 71 serves as a measuring guide by which the operator can judge the amount of droop which is provided in the suspended portion of the chart as it is installed in the recorder. In addition, the center plate serves to catch and retain any objects which may accidentally fall through the top opening of the recorder.

When the cover is raised upwardly to its open position illustrated at 62' in FIG. 7, air is spilled into the top of bay 56 from which it is directly exhausted by the fan through opening 61 in the bottom plate. This serves to reduce the suction effect of the fan at opening 55 in support plate 19, and this in turn reduces the vacuum in chamber 50 and in the chamber 52 below the strip chart. Tension in the suspended portion of the strip is thereby relieved to permit the operator to remove and reinstall the chart paper. When the cover is thereafter returned to its closed position the vacuum in chamber 52 is again automatically established so that the chart is tensioned into proper registry in the recorder.

Drive means is provided for conjointly and reversably rotating the two rollers so that the sprocket pins turn in unison for moving the chart along the X-axis. The drive means includes a stepper motor 72 mounted on the outer side of support plate 19, with the motor having an output shaft 73 which extends through bearings in the plates 19 and 20 to the opposite side where the shaft is connected with a double grooved drive pulley 74. A flexible timing belt 76 having sideways extendings teeth is reeved around one groove of drive pulley 72, around a larger diameter driven pulley 77 keyed to the axle 78 of roller 22, and around an idler pulley 79. The drive and driver pulleys are formed with suitable teeth into which the timing belt engages to achieve a positive drive. Idler pulley 79 is carried on an arm 81 which is adjustably mounted on support plate 20 by means of a fastener 82 for purposes of adjusting the tension in timing belt 76. A second flexible timing belt 83 having similar sideways extending teeth is reeved around the other groove of drive pulley 72, around a larger diameter toothed driven pulley 84 keyed to axle 86 of roller 23, and around an idler pulley 87. Idler pulley 87 in turn is carried on an arm 88 which is adjustably mounted on the support plate by means of fastener 89 for purposes of adjusting the tension in timing belt 83. It will be noted that the foregoing drive arrangement is simplified in comparison to existing recorder drive mechanisms, and eliminates the objectionable reverse flexing of the timing belt to reduce belt wear. Rotation of drive pulley 72 in either rotational direction thereby rotates the driven pulleys 77 and 84 in the conjoint rotational directions for rotating the rollers. motor 72 is controlled to operate at a rate of either 1500 increments per second with 5 mil steps, or at 3000 increments per second with 2.5 mil steps.

Recording means is provided for graphically marking the strip chart, and this means includes a recorder head 91 carried by cover 62. The recorder head comprises a support block 92 mounted for sliding movement along the Y-axis on a pair of spaced-apart parallel rods 93, 94 which extend between two mounting brackets 96, 97 carried by the cover. A pen holder 98 is mounted on and extends upwardly from block 92 over the surface of roller 23. A suitable marking instrument or stylus 99, such as a felt tip pen, ball point pen or liquid ink cartridge pen, is secured in an upright position on the end of holder 98 by suitable means such as the set screw 101 which is manually turned into and out of engagement with the pen.

Pen operating means is carried by block 92 to yieldably urge, as by a spring, holder 98 and the pen upwardly and out of contact with the strip chart, with such means being electrically energized to move the holder and pen downwardly so that the pen's tip contacts the strip chart. A suitable pen operating means which may be employed is the solenoid device described in said U.S. Pat. No. 3,673,604.

Traversing means is provided for moving block 92 and the pen back-and-forth along the Y-axis. The traversing means includes a stepper motor 102 mounted below cover plate 64, with the drive shaft of the motor extending upwardly through an opening in the cover plate where the shaft carries a toothed drive pulley 103. A drum 104 is rotatably mounted on the cover plate, and a toothed outer groove is formed about the outer diameter of the drum. A flexible timing belt 106 having sideways extending teeth is reeved around the drive pulley 103 and outer groove of drum 104. An idler pulley 107 engages a run of the timing belt, and the idler pulley is rotatably mounted on an arm 108 which is secured to cover plate 64 by a suitable fastener 109. The position of arm 108 can thereby be varied for adjusting the tension in the timing belt 106.

A pair of flexible traversing cables 110, 111 formed of a suitable electrical conducting material are provided for translating rotary motion of drum 104 into linear motion of block 92. One end of each cable is secured by suitable fasteners 112, 113 to opposite sides of block 92. Cable 110 is reeved around a pulley 114 rotatably carried on an L-shaped arm 116 which is mounted at one end of cover plate 64, while the other cable 111 is reeved around a pulley 117 rotatably carried on mounting bracket 97. The cable 111 is trained from pulley 117 through a slot provided in block 92, and is then reeved counter-clockwise, as viewed from above, around one inner groove formed about a smaller diameter portion 118 of drum 104 where it is secured thereto by a suitable fastener. The cable 110 is extended around pulley 114 and is reeved clockwise around another inner groove formed about the smaller diameter portion 118 of the drum where it is affixed thereto by a suitable fastener. An electrical conducting path is supplied from the drum through the cables for operating the solenoid within recording head 91 in a manner similar to that described in U.S. Pat. No. 3,673,604. A tension spring 119 is mounted between one arm of L-shaped member 116 and the cover plate for applying a pre-determined tension to the flexible operating cables. A pair of limit switches 121, 122 are mounted on the cover at opposite ends of the path of travel of the recording head. These limit switches are adapted to be actuated by contact with block 92 for operating the control circuit to limit the extent of travel of the block and pen between the two extreme positions along the Y-axis.

As illustrated in FIG. 6 pen 99 is preferably mounted at an orientation such that the axis of the pen is inclined forwardly through a small angle from the vertical, although the pen axis could also be oriented vertically, as desired. In either orientation the tip of the pen applies ink in contact with the portion of the chart which is suspended between the two rollers at a point which is just before the paper leaves roller 23, assuming counter-clockwise rotation as viewed in FIG. 6, but which is after disengagement by the pin 33. At this point of contact the paper is in tension due to action of the vacuum, and in addition the underlying surface of roller 23 provides a back-up for the pen. The tension in the paper tends to straighten out the creases in fan-fold paper so that proper pen marking is not interfered with as the area of the crease moves beneath the pen.

Control circuit means is provided in recorder 10 for receiving and converting input command data for operating recorder head 91 in concert with movement of the strip chart along the X-axis. Input data typically is received from a computer in a command format of ±X, ±Y, pen up and pen down signals. The control circuit means comprises electronic component which includes the printed circuit boards 123, 124 suspended on brackets 126, 127 within chamber 50, as well as the stepper motors 72 and 102 and other circuitry mounted within bay 56, all of which are in the path of movement of the air stream being exhausted by fan 57 from the housing. This air stream thereby serves to cool the electronic components while at the same time creating the partial vacuum in chamber 52.

A control panel is provided in top deck 18 for operating the control circuit. The control panel includes a power on/off pushbutton 128 for energizing the circuit. A pair of pushbuttons 129, 130 are provided for actuating stepper motor 72 in either rotational direction for manually stepping chart paper forward or reverse along the X-axis. An additional pair of pushbuttons 132, 133 are provided for actuating stepper motor 102 in either rotational direction for manually stepping recorder head 91 in either direction along the Y-axis. A pushbutton 134 is provided for actuating stepper motor at a high speed for increased manual advance of the chart along the X-axis, and a pushbutton 136 is provided for energizing the solenoid in recorder head 91 to pivot the marker pen into engagement with the chart paper. A pushbutton 137 is provided for resetting the plotter logic of the control circuit.

In operation, it will be assumed that graphic recorder 10 is to be used as an incremental plotter for recording information on strip chart 11 which comprises fan-fold paper supplied in a stack at the infeed end adjacent end wall 17. It is understood, however, that the invention can also record information on strip chart supplied from a paper roll which is mounted at the infeed end of the recorder.

The recorder is readied for use by depressing pushbutton 128 to energize the control circuit and start fan motor 58. Cover 62 is then unlatched and raised to the elevated position illustrated at 62' in FIG. 7, and hold-down frame 37 is pivoted upwardly. A portion of the strip chart from the stack is then unfolded and laid across the rollers 22 and 23. The operator engages the positioning holes of the chart with sprocket pins 32 such that the suspended portion of the chart droops downwardly. The operator gauges the correct amount of droop by hanging the bottom of the suspended portion a pre-determined distance above the surface of center plate 71. Hold-down frame 37 is then pivoted downwardly so that its spools 46 and rollers 49 contact the chart and hold it against roller 22. Cover 62 is then pivoted downwardly and latched, and this carries hold-down frame 38 downwardly so that its spools and rollers contact the chart and hold it against roller 23.

As cover 62 is closed the path of air spilling through the top of housing bay 56 is closed off so that the suction action of fan 57 acts through opening 55 in plate 19 and through openings 54 in partition 51 to create a partial vacuum within chamber 52. Some air continuously leaks around the side edges of the chart paper and through the positioning holes to assist in cooling the electronic components and motors within the housing. The portion of the chart which is suspended between the two rollers acts as a diaphragm against which the resulting differential air pressure exerts a downward force. Because the corresponding sprockets of the two rollers are maintained in fixed angular relationship by the timing belts 76 and 87, the paper is tensioned as the inwardly directed diagonal forces shown by the vectors 67–70 pull against the pins which are engaged with the positioning holes 34. As a result substantially equal stresses are applied at the same places on the holes which are engaged by the pins. Thus all of the holes tend to wear equally and this increases positioning accuracy during retracing of the chart.

Figure 5:
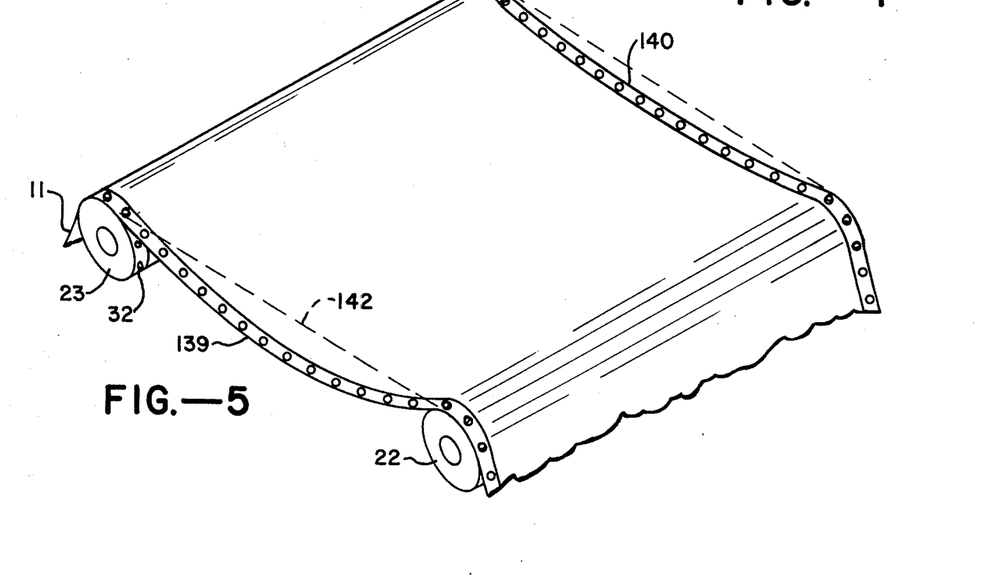
FIG. 5 is a fragmentary perspective view showing the suspension of a portion of a strip chart which is engaged between the rollers of the invention.

Any variations in positioning of the openings such as from uneven wear or manufacturing inaccuracy, or variations in dimensions of the paper such as from temperature or moisture changes, or both, are automatically compensated for by the droop of the suspended portion of the chart. FIG. 5 illustrates the effect of this compensation where the positioning holes along one side edge 139 of the chart paper are out of position with the openings on the opposite edge 140. In this case the edge 139 is caused to droop or suspend through a greater displacement from the roller tangent line 142 than the opposite edge 140 while maintaining paper tension so that the positioning holes maintain proper engagement with their associated sprocket pins.

With the strip chart loaded in the recorder, pushbuttons 132, 133 and 134 on the control panel are operated to actuate stepper motor 72 and move the chart to the desired position along the X-axis. Pushbuttons 129 and 130 are then operated to actuate stepper motor 102 and move recorder head 91 along the Y-axis to the desired starting point. Pushbutton 136 is then operated to actuate the solenoid in the recorder head for moving pen 99 into contact with the paper. Input command information is then fed into the control circuit for operating the recorder head in concert with movement of the strip chart as the marker pen applies ink to the paper.

Upon completion of the recording cycle cover 62 is unlatched and raised upwardly. This spills air through the top of housing bay 56 to reduce the suction behind the fan and thereby reduce the vacuum within chamber 52. This in turn reduces the downward pressure on the suspended portion of the chart and relieves the tension in the paper so that the positioning holes can be easily removed from the sprocket pins and the chart lifted from the rollers. With the cover raised another chart can then be installed in the manner previously described.

It will be realized that there has been provided herein an improved graphic recorder which obviates many of the problems and shortcomings of prior art recorders. The invention provides for a higher degree of recording accuracy as well as a greatly increased paper travel speed. The vacuum created tension in the chart paper pulls against the sprocket pins of the rollers along diagonal directions in a manner such that the positioning holes are pulled against the pins with uniform force and at the same places in the holes. The result is that the holes wear evenly so that the chart will accurately retrace on subsequent passes.

The downwardly convex curvature or droop of the suspended portion of the chart achieves automatic compensation for any variations in paper dimensions or misalignment of the positioning holes. In addition the recorder head of the invention is capable of more accurately applying ink from the pen onto the chart. As illustrated in FIG. 6 the point of the pen contacts the chart at a position just before the paper leaves the roller but behind the line at which the paper is free of the sprocket pins. The result is that the paper directly underneath the pen is in tension so that any creases or ridges are flattened out, while at th same time the roller surface serves as a back-up for the pen.

Paper travel speed is of a high order in the invention. No spring loaded floating sprockets or floating shafts are employed for paper positioning so that inertial problems which arise from such elements during high reversal rates are eliminated. Instead, the only significant mass involved in controlling movement of the tension portion of the paper is that of the paper itself. Friction on the paper is greatly reduced so that the response during rapid paper reversal and acceleration is very good. The elimination of the need for floating sprockets and shafts eliminates wear on the positioning holes due to the effects of inertia during reversal and acceleration of the parts. The reduced friction loading on the paper decreases power requirements for driving the chart, increases chart travel speed and increases paper registration accuracy.

The recorder of the invention is simpler in design and construction because of the elimination of the complicated mechanisms required in prior art devices for maintaining paper tension, such as floating sprockets and shafts. It is not necessary to periodically adjust the sprockets to maintain proper registry because the sprocket pins are fixed in relation to their associated rollers during manufacture. The roller drive is simpler and is designed so as to eliminate reverse flexing of the timing belts so that belt lift is increased. Installation and removal of a chart in the recorder is simplified because the step of lifting the cover automatically relieves the differential air pressure on the chart so that it can be easily lifted from the sprocket pins. Additionally, the latching of the cover re-establishes the differential air pressure for automatically creating the proper tension in the paper. Moreover, the exhaust air from the fan which creates the differential air pressure is used for cooling the electronic components of the control circuit.

While the foregoing embodiment is at present considered to be preferred it is understood that numerous variations and modifications may be made therein by those skilled in the art and it is intended to cover in the appended claims all such variations and modifications as fall within the true spirit and scope of the invention.

I claim:

1. Apparatus for transporting strip paper along a path from a supply of the paper, the paper being characterized in having means forming openings along the length of the paper, the combination of a housing having an opening, a pair of rollers mounted on the housing for supporting a portion of the strip paper across said opening, said rollers being mounted for rotation about respective transversely extending axes which are spaced-apart along said path, sprocket means on each of said rollers, said sprocket means including a plurality of radially extending pins positioned in register with the openings for releasably engaging the same, drive means for conjointly rotating said rollers and sprocket means for moving the strip paper along the path, and means creating a differential air pressure on opposite sides of the portion of strip paper which is suspended between the rollers, said differential air pressure serving to produce a resultant force acting in a direction against said suspended portion of the strip chart so that the outer side edges of the openings are urged into engagement with the outer sides of respective pins whereby the suspended portion of the strip paper maintains registry with the rollers irrespective of wear or irregularities in the openings or in dimensional changes of the paper.

2. In a recorder for graphically recording information on a strip chart, the combination of a housing having an upwardly directed opening, first and second rollers mounted at opposite ends of said opening for rotation about transversely extending axes, a plurality of radially outwardly extending pins mounted at equally spaced-apart positions about the outer peripheries of the opposite axial ends of each of said rollers, each of the pins at an end of each roller being in axial register with corresponding pins at the opposite ends of such roller whereby said pins engage openings which are formed along the outer margins of a strip chart which is suspended over the opening across the upper surfaces of said rollers, drive means for conjointly rotating said rollers whereby the pins of each roller turn with equal angular motion for moving the strip chart across the opening, means for creating a partial vacuum within the housing in a zone thereof which is between said rollers and below the suspended portion of the strip chart whereby the resulting differential air pressure tensions the suspended portion and causes the same to assume a downwardly convex curvature whereby outer side portions of the openings in the strip chart are urged into engagement with the outer portions of the corresponding pins on the rollers, and recording means for marking the portion of said strip chart which is suspended between the rollers.

3. A recorder as in claim 2 which includes a generally horizontal center plate mounted in the housing and positioned between said rollers at a pre-determined elevation below the upper surfaces of the rollers to serve as a guide whereby the operator can selectively determine the desired vertical displacement of said curvature when the strip chart is installed in the recorder.

4. A recorder as in claim 2 in which said housing includes a cover, and means for moving said cover from said housing for admitting air thereinto for reducing said vacuum whereby the tension in said strip chart is reduced for permitting removal or reinstallation of said strip chart on the rollers.

5. A recorder as in claim 2 in which said means creating the vacuum includes fan means for exhausting air from the housing along a path from said zone below the suspended portion of strip chart.

6. A recorder as in claim 5 which includes electronic circuit means coupled with said recording means for moving the latter along a Y-axis in coordination with movement of said strip chart along said X-axis, at least a portion of said electronic circuit means being positioned in said path of movement of air created by said fan means whereby said circuit means is cooled by the air.

7. A recorder as in claim 2 in which said pins are fixedly mounted on said rollers in said axial register relationship whereby the requirement is eliminated for subsequent adjustment of the pins relative to the rollers.

8. A recorder as in claim 7 in which the drive means includes a drive pulley, a motor for rotating said drive pulley, a pair of drive pulleys each of which is mounted for rotation on a respective roller, and a pair of flexible timing belts, each of which is reeved in a nonreversing path around said drive pulley and around a respective driven pulley.

9. In a recorder for graphically recording information on a strip chart, the combination of a housing having an opening, a pair of rollers mounted on the housing for supporting said strip chart across said opening, said rollers being mounted for rotation about respective transversely extending axes which are spaced-apart along an X-axis in the direction of movement of said strip chart, sprocket means on each of said rollers for releasably engaging opposite sides of said strip chart, drive means for rotating said rollers and sprocket means conjointly whereby the strip chart is moved along said X-axis, and means creating a differential air pressure on opposite sides of a portion of said strip chart which is suspended between said rollers, said differential air pressure serving to produce a resultant force acting in a direction to force said suspended portion of the strip chart so that the opposite sides of the chart are urged into engagement with respective sprocket means on the rollers, and recording means on the housing for marking said strip chart, said recording means being mounted for movement along a Y-axis.

10. A recorder as in claim 9 in which said means creating the differential air pressure includes means in the housing which in association with the suspended portion of said strip chart forms a chamber, and means establishing a pressure within said chamber which is lower than the ambient air pressure surrounding the housing whereby the air pressure differential acts to urge said suspended portion into a curved path which is convex toward said chamber.

11. A recorder as in claim 10 in which the means creating the lower pressure within the chamber comprises fan means for exhausting air from said chamber.

12. A recorder as in claim 9 in which said strip chart is formed with a plurality of openings which are spaced-apart along at least one path extending said X-axis, and said sprocket means on the rollers for engaging the strip chart comprises means forming a plurality of circumferencially spaced-apart, radially extending pins on a portion of each roller which is in register with said path of the openings formed in the strip chart whereby said openings engage with said pins so that said suspended portion of the strip chart assumes a curved path under influence of said differential air pressure.

13. A recorder as in claim 12 in which said pins are formed about the peripheries of the axial ends of each of said rollers whereby the differential air pressure acting on the suspended portion creates tension forces in the suspended portion which act against the pins which are engaged with the openings, said tension forces acting in a direction which generally converges at the center of the suspended portion such that the openings of the strip chart are pulled with uniform forces against the pins.

14. A recorder as in claim 12 in which said recording means include a pen holder adapted to hold a marking pen, and means mounting the pen holder for movement along said Y-axis, said mounting means positioning said pen with the marking tip thereof in contact with the suspended portion of said strip chart which is in tension at a position substantially tangent to the surface of one of said rollers whereby said surface forms a backing for said pen and any creases in the paper are substantially straightened out by the tension forces on the chart in the region of said pen.

* * * * *